S. H. LINTAN.
Clover Huller.
No. 92,326. Patented July 6, 1869.
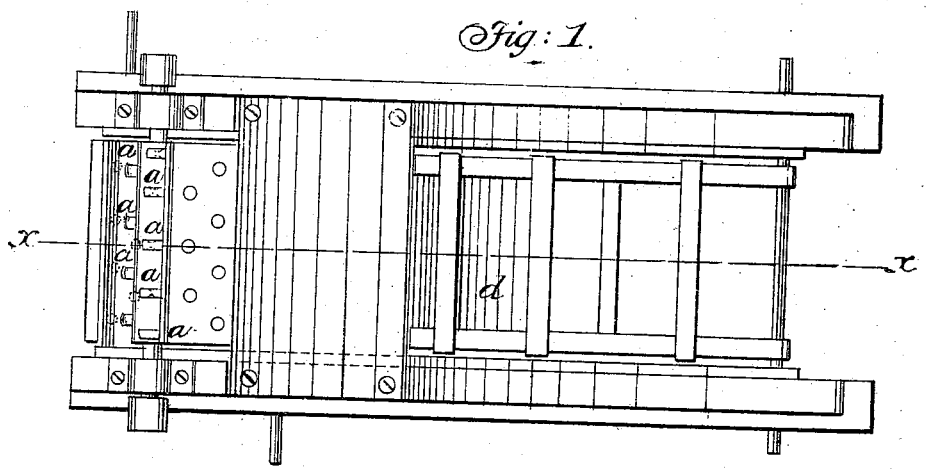
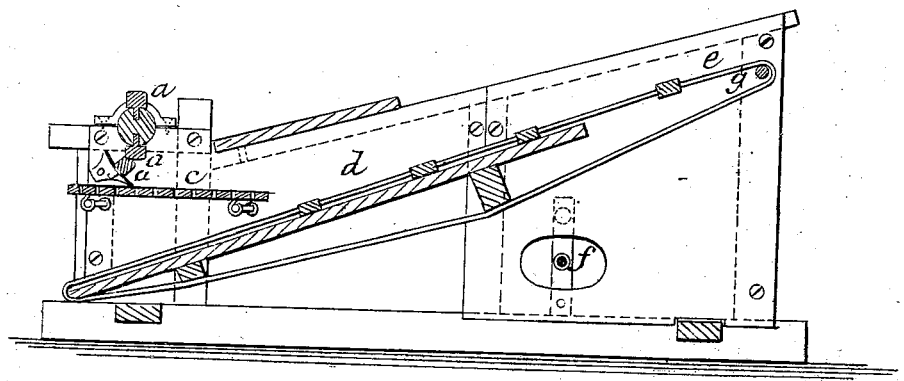

SAMUEL H. LINTAN, OF BURROWS, INDIANA.

Letters Patent No. 92,326, dated July 6, 1869.

IMPROVEMENT IN CLOVER AND FLAX-THRESHING MACHINE.

The Schedule referred to in these Letters Patent and making part of the same.

*To all whom it may concern:*

Be it known that I, SAMUEL H. LINTAN, of Burrows, in the county of Carroll, and State of Indiana, have invented a new and useful Improvement in Clover and Flax-Threshing Machines; and I do hereby declare that the following is a full, clear, and exact description thereof, which will enable others skilled in the art to make and use the same, reference being had to the accompanying drawings, forming part of this specification.

This invention relates to improvements in machines for threshing and separating clover and flax, and has for its object to provide a more simple and cheap machine than those now in use.

It consists in the combination of parts, as will be hereinafter more fully described.

Figure 1 represents a plan view of my improved machine; and

Figure 2 represents a longitudinal sectional elevation of the same.

Similar letters of reference indicate like parts.

The teeth $a$, of the cylinder, and its case, are roughened or grooved on their sides, to produce a better action upon the substance for separating the seed, and a shaker, $c$, is provided under the cylinder, for separating the grain from the straw, and operated by crank-shafts, suitably driven by a belt from the fan-shaft.

The grain falls through the shaker on to the inclined way $d$, up which it will be carried by the endless scraper $e$, and delivered over the elevated end to the action of the fan-blower, of which $f$ represents the axis.

The straw and chaff will also be carried up the incline with the grain, but owing to the passage of the latter through the separator $c$, they will be carried above the grain in the manner best calculated to facilitate their separation by the fan, and the straw will be carried on over the axle $g$ of the scrapers.

This arrangement admits of a very cheap construction, and affords a very efficient apparatus for the purpose, as will be readily observed.

Having thus described my invention,

I claim as new, and desire to secure by Letters Patent—

The combination, with the cylinder and inclined ways $d$, of the perforated shaker and the endless scraper or carrier $e$, all arranged substantially as and for the purpose described.

SAMUEL H. LINTAN.

Witnesses:
 THOMAS LOWE,
 JOHN WOODWARD.